(12) United States Patent
Shimamura et al.

(10) Patent No.: US 10,767,250 B2
(45) Date of Patent: *Sep. 8, 2020

(54) THICK STEEL PLATE FOR STRUCTURAL PIPES OR TUBES, METHOD OF PRODUCING THICK STEEL PLATE FOR STRUCTURAL PIPES OR TUBES, AND STRUCTURAL PIPES AND TUBES

(71) Applicant: JFE STEEL CORPORATION, Chiyoda-ku, Tokyo (JP)

(72) Inventors: Junji Shimamura, Tokyo (JP); Nobuyuki Ishikawa, Tokyo (JP); Shigeru Endo, Tokyo (JP); Shusaku Ota, Tokyo (JP)

(73) Assignee: JFE STEEL CORPORATION, Chiyoda-ku, Tokyo (JP)

( * ) Notice: Subject to any disclaimer, the term of this patent is extended or adjusted under 35 U.S.C. 154(b) by 317 days.

This patent is subject to a terminal disclaimer.

(21) Appl. No.: 15/560,613

(22) PCT Filed: Mar. 25, 2016

(86) PCT No.: PCT/JP2016/001765
§ 371 (c)(1),
(2) Date: Sep. 22, 2017

(87) PCT Pub. No.: WO2016/152172
PCT Pub. Date: Sep. 29, 2016

(65) Prior Publication Data
US 2018/0051363 A1 Feb. 22, 2018

(30) Foreign Application Priority Data
Mar. 26, 2015 (JP) .................... 2015-065167

(51) Int. Cl.
| | | |
|---|---|---|
| C21D 8/02 | (2006.01) |
| C22C 38/14 | (2006.01) |
| C22C 38/58 | (2006.01) |
| C22C 38/00 | (2006.01) |
| B23K 31/02 | (2006.01) |
| C22C 38/02 | (2006.01) |
| C22C 38/04 | (2006.01) |
| C22C 38/06 | (2006.01) |
| C22C 38/12 | (2006.01) |
| C22C 38/42 | (2006.01) |
| C22C 38/44 | (2006.01) |
| C22C 38/46 | (2006.01) |
| C22C 38/48 | (2006.01) |
| C22C 38/54 | (2006.01) |
| C22C 38/56 | (2006.01) |
| B23K 101/06 | (2006.01) |
| B23K 103/04 | (2006.01) |

(52) U.S. Cl.
CPC ............ *C22C 38/14* (2013.01); *B23K 31/027* (2013.01); *C21D 8/02* (2013.01); *C21D 8/0226* (2013.01); *C22C 38/00* (2013.01); *C22C 38/001* (2013.01); *C22C 38/02* (2013.01); *C22C 38/04* (2013.01); *C22C 38/06* (2013.01); *C22C 38/12* (2013.01); *C22C 38/42* (2013.01); *C22C 38/44* (2013.01); *C22C 38/46* (2013.01); *C22C 38/48* (2013.01); *C22C 38/54* (2013.01); *C22C 38/56* (2013.01); *C22C 38/58* (2013.01); *B23K 2101/06* (2018.08); *B23K 2103/04* (2018.08); *C21D 2211/002* (2013.01)

(58) Field of Classification Search
CPC ............ B23K 2101/06; B23K 2103/04; B23K 31/027; C21D 2211/002; C21D 8/02; C21D 8/0226; C22C 38/00
USPC ......................................... 148/335
See application file for complete search history.

(56) References Cited

U.S. PATENT DOCUMENTS

| | | | |
|---|---|---|---|
| 8,177,925 B2 | 5/2012 | Takahashi et al. | |
| 8,784,577 B2 | 7/2014 | Kami et al. | |
| 9,657,868 B2 | 5/2017 | Shimamura et al. | |
| 10,358,708 B2 * | 7/2019 | Shimamura .............. | B23K 9/18 |
| 2007/0193666 A1 * | 8/2007 | Asahi ...................... | B32B 15/01 |
| | | | 148/654 |
| 2015/0059912 A1 | 3/2015 | Takikawa | |
| 2015/0090370 A1 | 4/2015 | Shimamura et al. | |
| 2016/0040274 A1 | 2/2016 | Terazawa et al. | |
| 2018/0051363 A1 | 2/2018 | Shimamura et al. | |

FOREIGN PATENT DOCUMENTS

| | | |
|---|---|---|
| CN | 102203303 A | 9/2011 |
| CN | 102301026 A | 12/2011 |

(Continued)

OTHER PUBLICATIONS

Mar. 19, 2018, Extended European Search Report issued by the European Patent Office in the corresponding European Patent Application No. 16768075.0.

(Continued)

*Primary Examiner* — Jie Yang
(74) *Attorney, Agent, or Firm* — Kenja IP Law PC

(57) ABSTRACT

Disclosed is, as a high-strength steel plate of API X80 grade or higher with a thickness of 38 mm or more, a thick steel plate for structural pipes or tubes that exhibits high strength in the rolling direction, excellent Charpy properties at its mid-thickness part, and high material homogeneity without addition of large amounts of alloying elements. The thick steel plate for structural pipes or tubes disclosed herein has: a specific chemical composition; a microstructure mainly composed of bainite; a tensile strength of 620 MPa or more; a Charpy absorption energy $vE_{-20°\,C.}$ at $-20°$ C. at the mid-thickness part of 100 J or more; a variation of Vickers hardness in a plate thickness direction $\Delta HV_{10,t}$ of 50 or less; and a variation of Vickers hardness in a plate widthwise direction $\Delta HV_{10,c}$ of 50 or less.

20 Claims, No Drawings

(56) References Cited

FOREIGN PATENT DOCUMENTS

| | | | |
|---|---|---|---|
| CN | 104024453 A | 9/2014 | |
| CN | 104220623 A | 12/2014 | |
| CN | 104220624 A | 12/2014 | |
| EP | 2799567 A1 | 11/2014 | |
| EP | 2832889 A1 | 2/2015 | |
| EP | 2832890 A1 | 2/2015 | |
| JP | H1150188 A | 2/1999 | |
| JP | 2001158939 A | 6/2001 | |
| JP | 2010196164 A | 9/2010 | |
| JP | 2012241267 A | 12/2012 | |
| JP | 2013139628 A | 7/2013 | |
| JP | 2013194316 A | 9/2013 | |
| JP | 2013227670 A | 11/2013 | |
| JP | 2013227671 A | 11/2013 | |
| WO | 2010052928 A1 | 5/2010 | |
| WO | WO-2013002158 A1 * | 1/2013 | ............ C12M 21/08 |
| WO | 2014141632 A1 | 9/2014 | |

OTHER PUBLICATIONS

Oct. 15, 2018, Office Action issued by the Canadian Intellectual Property Office in the corresponding Canadian Patent Application No. 2,980,424.

Jun. 4, 2018, Office Action issued by the State Intellectual Property Office in the corresponding Chinese Patent Application No. 201680018221.9, with English language Search Report.

Dec. 19, 2018, Office Action issued by the Korean Intellectual Property Office in the corresponding Korean Patent Application No. 10-2017-7030020 with English language concise statement of relevance.

Jun. 14, 2016, International Search Report issued in the International Patent Application No. PCT/JP2016/001765.

Nov. 25, 2019, Office Action issued by the United States Patent and Trademark Office in the U.S. Appl. No. 15/560,677.

* cited by examiner

THICK STEEL PLATE FOR STRUCTURAL PIPES OR TUBES, METHOD OF PRODUCING THICK STEEL PLATE FOR STRUCTURAL PIPES OR TUBES, AND STRUCTURAL PIPES AND TUBES

TECHNICAL FIELD

This disclosure relates to a thick steel plate for structural pipes or tubes, and in particular, to a thick steel plate for structural pipes or tubes that has strength of API X80 grade or higher and that exhibits excellent Charpy properties at its mid-thickness part even with a plate thickness of 38 mm or more, and high material homogeneity.
This disclosure also relates to a method of producing a thick steel plate for structural pipes or tubes, and to a structural pipe or tube produced from the thick steel plate for structural pipes or tubes.

BACKGROUND

For excavation of oil and gas by seabed resource drilling ships and the like, structural pipes or tubes such as conductor casing steel pipes or tubes, riser steel pipes or tubes, and the like are used. In these applications, there has been an increasing demand for high-strength thick steel pipes or tubes of no lower than American Petroleum Institute (API) X80 grade from the perspectives of improving operation efficiency with increased pressure and reducing material costs.

Such structural pipes or tubes are often used with forged products containing alloying elements in very large amounts (such as connectors) subjected to girth welding. For a forged product subjected to welding, post weld heat treatment (PWHT) is performed to remove the residual stress caused by the welding from the forged product. In this case, there may be a concern about deterioration of mechanical properties such as strength after heat treatment. Accordingly, structural pipes or tubes are required to retain excellent mechanical properties, in particular high strength, in their longitudinal direction, that is, rolling direction, even after subjection to PWHT in order to prevent fractures during excavation by external pressure on the seabed.

Thus, for example, JPH1150188A (PTL 1) proposes a process for producing a high-strength steel plate for riser steel pipes or tubes that can exhibit excellent strength even after subjection to stress relief (SR) annealing, which is one type of PWHT, at a high temperature of 600° C. or higher, by hot-rolling a steel to which 0.30% to 1.00% of Cr, 0.005% to 0.0030% of Ti, and 0.060% or less of Nb are added, and then subjecting it to accelerated cooling.

In addition, JP2001158939A (PTL 2) proposes a welded steel pipe or tube that has a base steel portion and weld metal with chemical compositions in specific ranges and both having a yield strength of 551 MPa or more. PTL 2 describes that the welded steel pipe or tube has excellent toughness before and after SR in the weld zone.

JP2013139628A (PTL 3) describes a steel plate for line pipes or tubes excellent in material homogeneity, HIC resistance, and elongation that is obtained by hot-rolling a steel containing chemical components in a specific range and subjecting it to accelerated cooling in two stages, and a production method thereof.

CITATION LIST

Patent Literature

PTL 1: JPH1150188A
PTL 2: JP2001158939A
PTL 3: JP2013139628A

SUMMARY

Technical Problem

In the steel plate described in PTL 1, however, Cr carbide is caused to precipitate at the time of PWHT in order to compensate for the decrease in strength due to PWHT, which requires adding a large amount of Cr. Accordingly, in addition to high material cost, weldability and toughness may deteriorate.

In addition, the steel pipes or tubes described in PTL 2 focus on improving the characteristics of seam weld metal, without giving consideration to the base steel, and inevitably involve decrease in the strength of the base steel by PWHT. To secure the strength of the base steel, it is necessary to increase the strength before performing PWHT by controlled rolling or accelerated cooling.

However, when accelerated cooling is performed at a high cooling rate to improve strength, it is difficult to uniformly cool the entire steel plate, resulting in reduced uniformity of material homogeneity of the steel plate. Specifically, since the surface layer part of the steel plate is rapidly cooled during accelerated cooling, the surface layer part of the steel plate increases in hardness as compared to the inner part, and hardness variation in the plate thickness direction becomes larger. Such hardness variation in the plate thickness direction becomes significant especially with large plate thickness. In addition, for example, due to uneven cooling temperature during cooling, hardness may also vary in the plate widthwise direction. Such large hardness variation in the plate thickness direction and/or plate widthwise direction adversely affects various properties of the thick steel plate, such as strength, elongation, and formability. Thus, demands are being made for a technique that can provide a steel plate having both high strength and small hardness variation (i.e., high material homogeneity).

PTL 3 describes a method of reducing hardness variation in the plate thickness and widthwise directions, yet the plate thickness shown in examples is at most 38 mm. It is noted here that when the steel plate is cooled, as the plate thickness increases, the cooling rate at the mid-thickness part usually approaches the value determined by heat conduction, and thus setting a sufficiently high cooling rate at the mid-thickness part becomes harder with increasing plate thickness, which may adversely affect strength and toughness. Therefore, it is uncertain whether the technique of PTL 3, which shows only examples with a plate thickness up to 38 mm, can be applied to the manufacture of thicker steel plates. Moreover, the technique of PTL 3 is characterized by being excellent in HIC resistance as well as mechanical properties, yet PTL 3 neither specify the strength after PWHT required for application to structural pipes or tubes targeted by the present disclosure, nor clearly mention whether the technique of PTL 3 is applicable in the field of structural pipes or tubes.

The present disclosure could thus be helpful to provide, as a high-strength steel plate of API X80 grade or higher with a thickness of 38 mm or more, a thick steel plate for structural pipes or tubes that exhibits high strength in the rolling direction and excellent Charpy properties at its mid-thickness part, and furthermore, high material homogeneity, without addition of large amounts of alloying elements.

The present disclosure could also be helpful to provide a method of producing the above-described thick steel plate for structural pipes or tubes, and a structural pipe or tube produced from the thick steel plate for structural pipes or tubes.

Solution to Problem

For thick steel plates having a thickness of 38 mm or more, we conducted detailed studies on the influence of rolling conditions on their microstructures in order to determine how to balance material homogeneity and mechanical properties such as tensile strength and toughness. In general, the steel components for welded steel pipes or tubes and steel plates for welded structures are strictly limited from the viewpoint of weldability. Thus, high-strength steel plates of X65 grade or higher are manufactured by being subjected to hot rolling and subsequent accelerated cooling. Thus, the steel plate has a microstructure that is mainly composed of bainite or a microstructure in which martensite austenite constituent (abbreviated MA) is formed in bainite, yet, as the plate thickness increases, deterioration of Charpy properties at the mid-thickness part would be inevitable. In view of the above, we conducted intensive studies on a microstructure capable of exhibiting excellent resistance to PWHT, high strength, and good material homogeneity, and as a result, arrived at the following findings:

(a) Refinement of the steel microstructure is effective for improving the Charpy properties at the mid-thickness part. It is thus necessary to increase the cumulative rolling reduction ratio in the non-recrystallization region.

(b) On the other hand, if the cooling start temperature is excessively low, the ferrite area fraction increases and the strength and toughness decrease. It is thus necessary to set a high cooling start temperature.

(c) To ensure strength at the mid-thickness part while ensuring material homogeneity, it is necessary to form a microstructure in the surface layer with bainite and secure a sufficient cooling rate at the mid-thickness part in the subsequent cooling process.

Based on the above findings, we made intensive studies on the chemical compositions and microstructures of steel as well as on the production conditions, and completed the present disclosure.

Specifically, the primary features of the present disclosure are as described below.

1. A thick steel plate for structural pipes or tubes, comprising: a chemical composition that contains (consists of), in mass %, C: 0.030% to 0.100%, Si: 0.01% to 0.50%, Mn: 1.50% to 2.50%, Al: 0.080% or less, Mo: 0.05% to 0.50%, Ti: 0.005% to 0.025%, Nb: 0.005% to 0.080%, N: 0.001% to 0.010%, O: 0.005% or less, P: 0.010% or less, S: 0.0010% or less, and the balance consisting of Fe and inevitable impurities, with the chemical composition having a carbon equivalent $C_{eq}$ of 0.42 or more, where $C_{eq}$ is defined by:

$$C_{eq}=C+Mn/6+(Cu+Ni)/15+(Cr+Mo+V)/5 \quad (1),$$

where each element symbol indicates content in mass % of the element in the steel plate and has a value of 0 if the element is not contained in the steel plate; and a microstructure that is mainly composed of bainite, wherein the steel plate satisfies a set of conditions including: a tensile strength being 620 MPa or more; a Charpy absorption energy $vE_{-20°\,C.}$ at −20° C. at its mid-thickness part being 100 J or more; a variation in Vickers hardness in a plate thickness direction $\Delta HV_{10,t}$ being 50 or less; and a variation in Vickers hardness in a plate widthwise direction $\Delta HV_{10,c}$ being 50 or less.

2. The thick steel plate for structural pipes or tubes according to 1., wherein the chemical composition further contains, in mass %, V: 0.005% to 0.100%.

3. The thick steel plate for structural pipes or tubes according to 1. or 2., wherein the chemical composition further contains, in mass %, one or more selected from the group consisting of Cu: 0.50% or less, Ni: 0.50% or less, Cr: 0.50% or less, Ca: 0.0005% to 0.0035%, REM: 0.0005% to 0.0100%, and B: 0.0020% or less.

4. A method of producing a thick steel plate for structural pipes or tubes, comprising at least: heating a steel raw material having the chemical composition as recited in any one of 1. to 3. to a heating temperature of 1100° C. to 1300° C.; hot-rolling the heated steel raw material, with a cumulative rolling reduction ratio at 850° C. or lower being set to 70% or more, to obtain a hot-rolled steel plate; subjecting the hot-rolled steel plate to first cooling, whereby the hot rolled steel plate is subjected to accelerated cooling under a set of conditions including, in terms of a surface temperature of the steel plate, a cooling start temperature $T_{s,1}$ being no lower than $Ar_3$, a cooling end temperature $T_{e,1}$ being 500° C. or lower, and an average cooling rate $V_1$ being 20° C./s or higher and 100° C./s or lower, so that the following Expression (2) is satisfied:

$$3 \leq (700-T_{e,1})/V_1 \quad (2),$$

where units are ° C. for $T_{e,1}$ and ° C./s for $V_1$; and subjecting the steel plate to second cooling after the first cooling, whereby the steel plate is subjected to accelerated cooling under a set of conditions including, in terms of an average temperature of the steel plate, a cooling end temperature $T_{e,2}$ being 500° C. or lower and an average cooling rate $V_2$ being 5° C./s or higher.

5. The method producing a thick steel plate for structural pipes or tubes according to 4., further comprising, immediately after the second cooling, reheating the steel plate to a temperature range of 400° C. to 700° C. at a heating rate from 0.5° C./s to 10° C./s.

6. A structural pipe or tube formed from the thick steel plate for structural pipes or tubes as recited in any one of 1. to 3.

7. A structural pipe or tube obtainable by forming the steel plate as recited in any one of 1. to 3. into a tubular shape in its longitudinal direction, and then joining butting faces by welding from inside and outside to form at least one layer on each side along the longitudinal direction.

Advantageous Effect

According to the present disclosure, it is possible to provide, as a high-strength steel plate of API X80 grade or higher, a thick steel plate for structural pipes or tubes that exhibits high strength in the rolling direction, excellent Charpy properties at its mid-thickness part, and high material homogeneity without addition of large amounts of alloying elements, and a structural pipe or tube formed from the steel plate for structural pipes or tubes. As used herein, the term "thick" means that the plate thickness is 38 mm or more. The present disclosure can be suitably applied to plate thickness of 42 mm or more and even to larger plate thickness of 50 mm or more.

DETAILED DESCRIPTION

[Chemical Composition]

Reasons for limitations on the features of the disclosure will be explained below.

In the present disclosure, it is important that a thick steel plate for structural pipes or tubes has a specific chemical composition. The reasons for limiting the chemical composition of the steel as stated above are explained first. The % representations below indicating the chemical composition are in mass % unless otherwise noted.

C: 0.030% to 0.100%

C is an element for increasing the strength of steel. To obtain a desired microstructure for desired strength and toughness, the C content needs to be 0.030% or more. However, if the C content exceeds 0.100%, weldability deteriorates, weld cracking tends to occur, and the toughness of base steel and HAZ toughness are lowered. Therefore, the C content is set to 0.100% or less. The C content is preferably 0.050% to 0.080%.

Si: 0.01% to 0.50%

Si is an element that acts as a deoxidizing agent and increases the strength of the steel material by solid solution strengthening. To obtain this effect, the Si content is set to 0.01% or more. However, Si content of greater than 0.50% causes noticeable deterioration in HAZ toughness. Therefore, the Si content is set to 0.50% or less. The Si content is preferably 0.05% to 0.20%.

Mn: 1.50% to 2.50%

Mn is an effective element for increasing the hardenability of steel and improving strength and toughness. To obtain this effect, the Mn content is set to 1.50% or more. However, Mn content of greater than 2.50% causes deterioration of weldability. Therefore, the Mn content is set to 2.50% or less. The Mn content is preferably from 1.80% to 2.00%.

Al: 0.080% or Less

Al is an element that is added as a deoxidizer for steelmaking. However, Al content of greater than 0.080% leads to reduced toughness. Therefore, the Al content is set to 0.080% or less. The Al content is preferably from 0.010% to 0.050%.

Mo: 0.05% to 0.50%

Mo is a particularly important element for the present disclosure that functions to greatly increase the strength of the steel plate by forming fine complex carbides with Ti, Nb, and V, while suppressing pearlite transformation during cooling after hot rolling. To obtain this effect, the Mo content is set to 0.05% or more. However, Mo content of greater than 0.50% leads to reduced toughness at the heat-affected zone (HAZ). Therefore, the Mo content is set to 0.50% or less.

Ti: 0.005% to 0.025%

In the same way as Mo, Ti is a particularly important element for the present disclosure that forms complex precipitates with Mo and greatly contributes to improvement in the strength of steel. To obtain this effect, the Ti content is set to 0.005% or more. However, adding Ti beyond 0.025% leads to deterioration in HAZ toughness and toughness of base steel. Therefore, the Ti content is set to 0.025% or less.

Nb: 0.005% to 0.080%

Nb is an effective element for improving toughness by refining microstructural grains. In addition, Nb forms composite precipitates with Mo and contributes to improvement in strength. To obtain this effect, the Nb content is set to 0.005% or more. However, Nb content of greater than 0.080% causes deterioration of HAZ toughness. Therefore, the Nb content is set to 0.080% or less.

N: 0.001% to 0.010%

N is normally present in the steel as an inevitable impurity and, in the presence of Ti, forms TiN. To suppress coarsening of austenite grains caused by the pinning effect of TiN, the N content is set to 0.001% or more. However, TiN decomposes in the weld zone, particularly in the region heated to 1450° C. or higher near the weld bond, and produces solute N. Accordingly, if the N content is excessively increased, a decrease in toughness due to the formation of the solute N becomes noticeable. Therefore, the N content is set to 0.010% or less. The N content is more preferably 0.002% to 0.005%.

O: 0.005% or less, P: 0.010% or less, S: 0.0010% or Less

In the present disclosure, O, P, and S are inevitable impurities, and the upper limit for the contents of these elements is defined as follows. O forms coarse oxygen inclusions that adversely affect toughness. To suppress the influence of the inclusions, the O content is set to 0.005% or less. In addition, P lowers the toughness of the base metal upon central segregation, and a high P content causes the problem of reduced toughness of base metal. Therefore, the P content is set to 0.010% or less. In addition, S forms MnS inclusions and lowers the toughness of base metal, and a high S content causes the problem of reduced toughness of the base material. Therefore, the S content is set to 0.0010% or less. It is noted here that the O content is preferably 0.003% or less, the P content is preferably 0.008% or less, and the S content is preferably 0.0008% or less. No lower limit is placed on the contents of O, P, and S, yet in industrial terms the lower limit is more than 0%. On the other hand, excessively reducing the contents of these elements leads to longer refining time and increased cost. Therefore, the O content is 0.0005% or more, the P content is 0.001% or more, and the S content is 0.0001% or more.

In addition to the above elements, the thick steel plate for structural pipes or tubes disclosed herein may further contain V: 0.005% to 0.100%.

V: 0.005% to 0.100%

In the same way as Nb, V forms composite precipitates with Mo and contributes to improvement in strength. When V is added, the V content is set to 0.005% or more to obtain this effect. However, V content of greater than 0.100% causes deterioration of HAZ toughness. Therefore, when V is added, the V content is set to 0.100% or less.

In addition to the above elements, the thick steel plate for structural pipes or tubes may further contain Cu: 0.50% or less, Ni: 0.50% or less, Cr: 0.50% or less, Ca: 0.0005% to 0.0035%, REM: 0.0005 to 0.0100%, and B: 0.0020% or less.

Cu: 0.50% or Less

Cu is an effective element for improving toughness and strength, yet excessively adding Cu causes deterioration of weldability. Therefore, when Cu is added, the Cu content is set to 0.50% or less. No lower limit is placed on the Cu content, yet when Cu is added, the Cu content is preferably 0.05% or more.

Ni: 0.50% or Less

Ni is an effective element for improving toughness and strength, yet excessively adding Ni causes deterioration of resistance to PWHT. Therefore, when Ni is added, the Ni content is set to 0.50% or less. No lower limit is placed on the Ni content, yet when Ni is added, the Ni content is preferably to 0.05% or more.

Cr: 0.50% or Less

In the same way as Mn, Cr is an effective element for obtaining sufficient strength even with a low C content, yet excessive addition lowers weldability. Therefore, when Cr is added, the Cr content is set to 0.50% or less. No lower limit is placed on the Cr content, yet when Cr is added, the Cr content is preferably set to 0.05% or more.

Ca: 0.0005% to 0.0035%

Ca is an effective element for improving toughness by morphological control of sulfide inclusions. To obtain this effect, when Ca is added, the Ca content is set to 0.0005% or more. However, adding Ca beyond 0.0035% does not increase the effect, but rather leads to a decrease in the cleanliness of the steel, causing deterioration of toughness. Therefore, when Ca is added, the Ca content is set to 0.0035% or less.

REM: 0.0005% to 0.0100%

In the same way as Ca, a REM (rare earth metal) is an effective element for improving toughness by morphological control of sulfide inclusions in the steel. To obtain this effect, when a REM is added, the REM content is set to 0.0005% or more. However, excessively adding a REM beyond 0.0100% does not increase the effect, but rather leads to a decrease in the cleanliness of the steel, causing deterioration of toughness. Therefore, the REM is set to 0.0100% or less.

B: 0.0020% or Less

B segregates at austenite grain boundaries and suppresses ferrite transformation, thereby contributing particularly to preventing reduction in HAZ strength. However, adding B beyond 0.0020% does not increase the effect. Therefore, when B is added, the B content is set to 0.0020% or less. No lower limit is placed on the B content, yet when B is added, the B content is preferably 0.0002% or more.

The thick steel plate for structural pipes or tubes disclosed herein consists of the above-described components and the balance of Fe and inevitable impurities. As used herein, the phrase "consists of . . . the balance of Fe and inevitable impurities" is intended to encompass a chemical composition that contains inevitable impurities and other trace elements as long as the action and effect of the present disclosure are not impaired.

In the present disclosure, it is important that all of the elements contained in the steel satisfy the above-described conditions and that the chemical composition has a carbon equivalent $C_{eq}$ of 0.42 or more, where $C_{eq}$ is defined by:

$$C_{eq}=C+Mn/6+(Cu+Ni)/15+(Cr+Mo+V)/5 \qquad (1),$$

where each element symbol indicates content in mass % of the element in the steel plate and has a value of 0 if the element is not contained in the steel plate.

$C_{eq}$ is expressed in terms of carbon content representing the influence of the elements added to the steel, which is commonly used as an index of strength as it correlates with the strength of base metal. In the present disclosure, to obtain a high strength of API X80 grade or higher, $C_{eq}$ is set to 0.42 or more. $C_{eq}$ is preferably 0.43 or more. No upper limit is placed on $C_{eq}$, yet a preferred upper limit is 0.50.

[Microstructure]

Next, the reasons for limitations on the steel microstructure according to the disclosure are described.

In the present disclosure, it is important for the steel plate to have a microstructure mainly composed of bainite. Controlling the microstructure in this way makes it possible to provide high strength of API X80 grade. These microstructural conditions need to be satisfied regardless of the position in the thickness direction of the steel plate. Since a cooling process to reduce microstructural variation, which will be explained later, is adopted in the present disclosure, it is considered that the microstructural conditions are satisfied over the entire thickness as long as the conditions explained below are met in the microstructure of the mid-thickness part.

As used herein, the phrase "mainly composed of bainite" indicates that the area fraction of bainite in the microstructure of the steel plate is 90% or more. The area fraction of bainite is preferably 95% or more. On the other hand, the area fraction of bainite is desirably as high as possible without any particular upper limit. The area fraction of bainite may be 100%.

The amount of microstructure other than bainite is preferably as small as possible. However, when the area fraction of bainite is sufficiently high, the influence of the residual microstructure is almost negligible, and an acceptable total area fraction of one or more of the microstructure other than bainite in the microstructure is up to 10%. A preferred total area fraction of the microstructure other than bainite is up to 5%. Examples of the residual microstructure include ferrite, pearlite, cementite, martensite, and martensite austenite constituent.

The area fraction of bainite may be determined by mirror-polishing a sample taken from the mid-thickness part, etching its surface with nital, and observing five or more locations randomly selected on the surface under a scanning electron microscope (at 1000 times magnification).

[Mechanical Properties]

The thick steel plate for structural pipes or tubes disclosed herein has mechanical properties including: a tensile strength of 620 MPa or more; and a Charpy absorption energy $vE_{-20° C.}$ at $-20°$ C. at its mid-thickness part of 100 J or more. In this respect, variation in tensile strength, Charpy absorption energy, and Vickers hardness can be measured with the method described in examples explained later. No upper limit is placed on tensile strength, yet a normal upper limit is, for example, 825 MPa for X80 grade and 990 MPa for X100 grade. Similarly, the upper limit for $vE_{-20° C.}$ is also not particularly limited, yet it is normally 500 J or less.

In the present disclosure, it is also important for the thick steel plate for structural pipes or tubes to have: a variation in Vickers hardness in the plate thickness direction $\Delta HV_{10,t}$ of 50 or less; and a variation in Vickers hardness in the plate widthwise direction $\Delta HV_{10,c}$ of 50 or less. A large hardness variation in either or both of the plate thickness and widthwise directions adversely affects the properties of the steel plate, such as strength, elongation, formability, HIC resistance, and SSCC resistance. For example, if the hardness of the steel plate is excessively high in the surface layer part as compared to the inside of the steel plate, springback tends to occur after forming of the steel plate or crack sensitivity to hydrogen sulfide increases. In addition, a large hardness variation in the plate widthwise direction presents the problems of a desired shape not being able to be obtained due to a difference in the way of deformation between hard and soft parts during forming, and, in the case of the steel plate cut into pieces, such pieces differing in strength and elongation. Therefore, both $\Delta HV_{10,t}$ and $\Delta HV_{10,c}$ are set to 50 or less in the present disclosure. It is noted here that $\Delta HV_{10,t}$ and $\Delta HV_{10,c}$ are each preferably 40 or less, and more preferably 30 or less. On the other hand, $\Delta HV_{10,t}$ and $\Delta HV_{10,c}$ are preferably as small as possible without any particular lower limit. It suffices for $\Delta HV_{10,t}$ and $\Delta HV_{10,c}$ to be no less than 0. $\Delta HV_{10,t}$ and $\Delta HV_{10,c}$ can be measured with the methods in the Examples described later.

[Steel Plate Production Method]

Next, a method of producing a steel plate according to the present disclosure is described. In the following explanation, it is assumed that the temperature is the average temperature in the thickness direction of the steel plate unless otherwise noted. The average temperature in the plate thickness direction can be determined by, for example, the plate thickness, surface temperature, or cooling conditions through simulation calculation or the like. For example, the average temperature in the plate thickness direction of the steel plate can be determined by calculating the temperature distribution in the plate thickness direction using a finite difference method.

The thick steel plate for structural pipes or tubes disclosed herein may be produced by sequentially performing operations (1) to (4) below on the steel raw material having the above chemical composition. Additionally, optional operation (5) may be performed.
(1) heating the steel raw material to a heating temperature of 1100° C. to 1300° C.;
(2) hot-rolling the heated steel material, with a cumulative rolling reduction ratio at 850° C. or lower being set to 70% or more, to obtain a hot-rolled steel plate;
(3) subjecting the hot-rolled steel plate to first cooling, whereby the hot-rolled steel plate is subjected to accelerated cooling under a set of conditions including, in terms of a surface temperature of the steel plate, a cooling start temperature $T_{s,1}$ being no lower than $Ar_3$, a cooling end temperature $T_{e,1}$ being 500° C. or lower, and an average cooling rate $V_1$ being 20° C./s or higher and 100° C./s or lower, so that Expression (2) detailed later is satisfied;
(4) subjecting the steel plate to second cooling after the first cooling, whereby the steel plate is subjected to accelerated cooling under a set of conditions including a cooling end temperature $T_{e,2}$ being 500° C. or lower in terms of an average temperature of the steel plate, and an average cooling rate $V_2$ being 5° C./s or higher in terms of a surface temperature of the steel plate; and
(5) immediately after the second cooling, reheating the steel plate to a temperature range of 400° C. to 700° C. at a heating rate from 0.5° C./s to 10° C./s.

Specifically, the above-described operations may be performed as described below.

[Steel Raw Material]

The above-described steel raw material may be prepared with a regular method. The method of producing the steel raw material is not particularly limited, yet the steel raw material is preferably prepared with continuous casting.

[Heating]

The steel raw material is heated prior to rolling. At this time, the heating temperature is set from 1100° C. to 1300° C. Setting the heating temperature to 1100° C. or higher makes it possible to cause carbides in the steel raw material to dissolve, and to obtain the target strength. The heating temperature is preferably set to 1120° C. or higher. However, a heating temperature of higher than 1300° C. coarsens austenite grains and the final steel microstructure, causing deterioration of toughness. Therefore, the heating temperature is set to 1300° C. or lower. The heating temperature is preferably set to 1250° C. or lower.

[Hot Rolling]

Then, the heated steel raw material is rolled to obtain a hot-rolled steel plate. At this point, if the cumulative rolling reduction ratio at 850° C. or lower is below 70%, it is not possible to ensure Charpy properties at the mid-thickness part of the steel plate after the rolling. Therefore, the cumulative rolling reduction ratio at 850° C. or lower is set to 70% or more. No upper limit is placed on the cumulative rolling reduction ratio at 850° C. or lower, yet the upper limit is preferably 90%. As will be described later, to start cooling in the first cooling from the temperature range of no lower than $Ar_3$, it is preferable to finish the rolling when the temperature is at or above $Ar_3$.

After completion of the hot rolling, the hot-rolled steel plate is subjected to accelerated cooling. In the present disclosure, it is important to divide the accelerated cooling into two stages, first cooling and second cooling, and to perform cooling in each cooling stage under specific conditions. In other words, the present disclosure attempts to cause a microstructure in which hardening is suppressed to be built up in the surface layer part of the steel plate while increasing the strength of the steel plate as a whole in the first cooling, while in the second cooling solely increasing the strength and toughness of the steel plate. For each cooling stage, specific cooling procedures will be described below.

[First Cooling]

In the first cooling, the hot-rolled steel plate is cooled under the specific conditions explained below. The temperature in the following explanation on the first cooling represents the surface temperature of the steel plate unless otherwise specified.

Cooling Start Temperature $T_{s,1}$: No Lower than $Ar_3$

In the first cooling, the hot-rolled steel plate is cooled from a temperature range of no lower than $Ar_3$. When cooling is started from a temperature range below $Ar_3$, ferrite increases, and it is not possible to sufficiently increase the strength of the steel plate. In the present disclosure, $Ar_3$ is calculated by:

$$Ar_3(° C.)=910-310C-80Mn-20Cu-15Cr-55Ni-80Mo,$$

where each element symbol indicates content in mass % of the element and has a value of 0 if the element is not contained in the steel. No upper limit is placed on $T_{s,1}$. $T_{s,1}$ is preferably no lower than $Ar_3$ and no higher than the rolling finish temperature +100° C.

Average Cooling Rate $V_1$: 20° C./s or Higher and 100° C./s or Lower

It is important to control the cooling rate in order to reduce hardness variation of the steel plate and increase material homogeneity while increasing the strength of the steel plate. When the cooling rate is below 20° C./s at the surface of the steel plate, sufficient strength cannot be obtained in the entire steel plate. On the other hand, when the cooling rate exceeds 100° C./s, hard phases such as martensite and martensite austenite constituent (MA) form at the surface layer part and the hardness increases remarkably, causing a large variation in hardness. Therefore, the average cooling rate in the first cooling is set from 20° C./s to 100° C./s.

Cooling End Temperature $T_{e,1}$: 500° C. or Lower

Cooling is carried out under the above-described conditions to form a bainite phase in the surface layer part of the steel plate. However, when the cooling end temperature exceeds 500° C., bainite formation is insufficient, and if the second cooling is started in this state, martensite and martensite austenite constituent (MA) form in the surface layer part. Therefore, the cooling end temperature in the first stage is set to 500° C. or lower in terms of the surface temperature of the steel plate. On the other hand, no lower limit is placed on the cooling end temperature. However, when the cooling end temperature is excessively low, the start of the subsequent second cooling is delayed and the cooling effect is insufficient, and high strength and toughness cannot be obtained. Therefore, the cooling end temperature is preferably set to 300° C. or higher.

In the first cooling, it is important to perform accelerated cooling under the conditions that satisfy:

$$3 \leq (700-T_{e,1})/V_1 \qquad (2),$$

where units are ° C. for $T_{e,1}$ and ° C./s for $V_1$.

The right side of Expression (2) represents the approximate cooling time in the first cooling. Thus, equation (2) indicates that it is necessary to continue cooling in the first cooling for 3 seconds or more. The reason is that it takes more than 3 seconds for the bainite phase to be sufficiently formed such that the microstructure at the surface layer part does not become hard. If Expression (2) is not satisfied, martensite and martensite austenite constituent form at the surface layer part of the steel plate, and the hardness of the surface layer part remarkably increases, causing a large variation in hardness in the plate thickness direction. Therefore, the first cooling needs to be performed under the conditions that satisfy Expression (2). On the other hand, no upper limit is placed on the value on the right side of Expression (2), yet from the perspective of ensuring sufficient strength in the entire steel plate, the value is preferably 30 or less.

[Second Cooling]

Then, the steel plate cooled in the first cooling is further cooled under the conditions explained below. The temperature in the following explanation on the second cooling represents the average temperature of the steel plate unless otherwise specified.

Average Cooling Rate $V_2$: 5° C./s or Higher

As used herein, the average cooling rate $V_2$ in the second cooling is defined as: ("the average temperature of the steel plate at the start of the second cooling"–"the average temperature of the steel plate when the steel plate surface recuperates after completion of the second cooling")/("the point in time at which the surface of the steel plate recuperates after completion of the second cooling"–"the second cooling start time"). At the end of the second cooling, the temperature of the steel plate is lower in the surface than at the mid-thickness part, yet the heat is then transferred from the mid-thickness part at a higher temperature to the surface of the steel plate, and the surface temperature rises to a local maximum. This phenomenon is referred to as heat recuperation. The temperature difference in the plate thickness direction of the steel plate is small in a heat recuperation state, that is, when the surface temperature reaches a local maximum. Dividing the temperature difference, obtained by the average temperature of the steel plate in the plate thickness direction at the start of the second cooling minus the average temperature of the steel plate in the plate thickness direction when the surface of the steel plate recuperates, by the time from the start of cooling to the completion of heat recuperation can yield an average cooling rate in the second cooling.

If the average cooling rate is below 5° C./s, the strength increasing effect is insufficient. Therefore, the average cooling rate in the second cooling is set to 5° C./s or higher. To meet this cooling condition in a thick steel plate, it is necessary to perform cooling in a temperature range in which the surface of the steel plate is at or above 200° C. with a cooling rate at the surface of the steel plate being set above 100° C./s.

As cooling proceeds from the surface of the steel plate, the temperature of the surface of the steel plate may be lower than that of the mid-thickness part at the start of the second cooling after the completion of the first cooling. According to the present disclosure, however, since the cooling rate in the second cooling is determined on the basis of the average temperature of the steel plate in the thickness direction rather than the surface temperature of the steel plate as described above, it is possible to set a necessary cooling rate for obtaining desired properties even in the inner part of the steel plate, as long as the cooling rate specified herein is secured. The average temperature and the cooling rate of the steel plate in the plate thickness direction cannot be directly determined by physical measurement, yet can be calculated in real time by simulation based on surface temperature change.

Cooling End Temperature $T_{e,2}$: 500° C. or Lower

In a steel having a low alloy composition with reduced alloy elements, coarse MAs are formed and toughness deteriorates as the cooling end temperature in the second cooling becomes higher. Therefore, the cooling end temperature in the second cooling is set to 500° C. or lower. The cooling end temperature $T_{e,2}$ in the second cooling is the average temperature in the plate thickness direction of the steel plate at the point in time when the cooling in the second cooling ends and the surface of the steel plate recuperates. On the other hand, no lower limit is placed on the cooling end temperature, yet from the perspective of reducing hardness variation in the plate thickness direction, a preferred lower limit is 200° C.

[Reheating]

After completion of the accelerated cooling, reheating may be performed. In the case where the reheating is performed, reheating is carried out, immediately after the accelerated cooling, to a temperature range of 400° C. to 700° C. at a heating rate from 0.5° C./s to 10° C./s. As used herein, the phrase "immediately after the accelerated cooling" refers to starting reheating at a heating rate from 0.5° C./s to 10° C./s within 120 seconds after the completion of the accelerated cooling. Even if the accelerated cooling end temperature is low in the accelerated cooling and a large amount of low-temperature transformed microstructure other than bainite, such as martensite, is produced, performing reheating and tempering makes it possible to increase material uniformity and reduce hardness variation.

Through the above process, it is possible to produce a thick steel plate for structural pipes or tubes that has strength of API X80 grade or higher and that is excellent in Charpy properties at its mid-thickness part and in material homogeneity. As described above, the thick steel plate for structural pipes or tubes disclosed herein is intended to have a plate thickness of 38 mm or more. Although no upper limit is placed on the plate thickness, the present disclosure is preferably applicable to steel plates with a plate thickness of 75 mm or less because it may be difficult to satisfy the production conditions described herein if the plate thickness is greater than 75 mm.

[Steel Pipe or Tube]

A steel pipe or tube can be produced by using the steel plate thus obtained as a material. The steel pipe or tube may be, for example, a structural pipe or tube that is obtainable by forming the thick steel plate for structural pipes or tubes into a tubular shape in its longitudinal direction, and then joining butting faces by welding. The method of producing a steel pipe or tube is not limited to a particular method, and any method is applicable. For example, a UOE steel pipe or tube may be obtained by forming a steel plate into a tubular shape in its longitudinal direction by U press and O press following a conventional method, and then joining butting faces by seam welding. Preferably, the seam welding is performed by performing tack welding and subsequently submerged arc welding from inside and outside to form at least one layer on each side. The flux used for submerged arc welding is not limited to a particular type, and may be a fused flux or a bonded flux. After the seam welding, expansion is carried out to remove welding residual stress and to improve the roundness of the steel pipe or tube. In the expansion, the expansion ratio (the ratio of the amount of change in the outer diameter before and after expansion of the pipe or tube to the outer diameter of the pipe or tube before expansion) is normally set from 0.3% to 1.5%. From the viewpoint of the balance between the roundness improving effect and the capacity required for the expanding device, the expansion rate is preferably from 0.5% to 1.2%. Instead of the above-mentioned UOE process, a press bend method, which is a sequential forming process to perform three-point bending repeatedly on a steel plate, may be applied to form a steel pipe or tube having a substantially circular cross-sectional shape before performing seam welding in the same manner as in the above-described UOE process. In the case of the press bend method, as in the UOE process, expansion may be performed after seam welding. In the expansion, the expansion ratio (the ratio of the amount of change in the outer diameter before and after expansion of the pipe or tube to the outer diameter of the pipe or tube before expansion) is normally set from 0.3% to 1.5%. From the viewpoint of the balance between the roundness increasing effect and the capacity required for the expanding device, the expansion rate is preferably from 0.5% to 1.2%. Optionally, preheating before welding or heat treatment after welding may be performed.

EXAMPLES

Steels having the chemical compositions presented in Table 1 (Steels A to K) were prepared by steelmaking and formed into slabs by continuous casting. The obtained slabs were heated and hot rolled, and immediately cooled in two stages using a water cooling type accelerated cooling apparatus to produce steel plates with a thickness of 38 mm to 51 mm (Nos. 1 to 18). The production conditions of each steel plate are presented in Table 2. For each obtained steel plate, the area fraction of bainite in the microstructure and the mechanical properties were evaluated as described below. The evaluation results are presented in Table 3.

The area fraction of bainite was evaluated by observing five or more locations randomly selected on the surface of a sample taken from the mid-thickness part under a scanning electron microscope (at 1000 times magnification).

Among the mechanical properties, 0.5% yield strength (YS) and tensile strength (TS) were measured by preparing full-thickness test pieces sampled from each obtained thick steel plate in a direction perpendicular to the rolling direction, and then conducting a tensile test on each test piece in accordance with JIS Z 2241 (1998).

As for Charpy properties, among the mechanical properties, three 2 mm V notch Charpy test pieces were sampled from the mid-thickness part with their longitudinal direction parallel to the rolling direction, and the test pieces were subjected to a Charpy impact test at −20° C., to obtain absorption energy $vE_{-20°\ C.}$, and the average values were calculated.

Among the mechanical properties, variation in Vickers hardness was determined as explained below. At the cross section perpendicular to the rolling direction of the steel plate, Vickers hardness $HV_{10}$ was measured at more than one point under a load of 10 kgf in accordance with JIS Z 2244, and the difference between the maximum and minimum of the measured values was used as variation in Vickers hardness $\Delta HV_{10}$. At that time, variation $\Delta HV_{10,t}$ in the plate thickness direction was determined by measuring the Vickers hardness at the mid-thickness part from a position 1 mm below the surface layer of the steel plate to the depths of the steel plate at pitches of 1 mm in the plate thickness direction across the entire thickness. Further, variation $\Delta HV_{10,c}$ in the plate width direction was determined by measuring the Vickers hardness at locations of 1 mm below the surface layer of the steel plate across the entire plate width at pitches of 20 mm in the plate widthwise direction. Although the hardness in the plate widthwise direction was also measured at locations of t/4 (locations of one-fourth the plate thickness) and at locations of t/2 (the mid-thickness part), in any of the steel plates, largest hardness variation was observed at the location of 1 mm below the surface layer, and thus hardness variation at this location was used as variation in Vickers hardness of each steel plate.

For evaluation of heat affected zone (HAZ) toughness, a test piece was prepared, to which heat hysteresis corresponding to heat input of 40 kJ/cm to 100 kJ/cm was applied by a reproducing apparatus of weld thermal cycles, and the pest piece was subjected to a Charpy impact test. Measurements were made in the same manner as in the evaluation of Charpy absorption energy at −20° C. described above, and the case of Charpy absorption energy at −20° C. being 100 J or more was evaluated as "Good", and less than 100 J as "Poor".

Further, for evaluation of PWHT resistance, PWHT treatment was performed on each steel plate using a gas atmosphere furnace. At this time, heat treatment was performed on each steel plate at 600° C. for 2 hours, after which the steel plate was removed from the furnace and cooled to room temperature by air cooling. Each steel plate subjected to PWHT treatment was measured for 0.5% YS, TS, and $vE_{-20°\ C.}$ in the same manner as in the above-described measurements before PWHT.

As can be seen from Table 3, examples (Nos. 1 to 7) which satisfy the conditions disclosed herein were excellent in material homogeneity (i.e., small variation in Vickers hardness), strength, toughness, and HAZ toughness before PWTH, and maintained sufficient strength even after subjection to PWHT at a high temperature of 600° C. In contrast, comparative examples (Nos. 8 to 18) which do not satisfy the conditions disclosed herein were inferior in material homogeneity and mechanical properties before and/or after subjection to PWTH. For example, Nos. 8 to 14 were inferior in strength of base metal, material homogeneity, and Charpy properties, although their steel compositional ranges met the conditions of the present disclosure. Of these, for No. 9, Charpy properties are considered to be deteriorated due to a low cumulative rolling reduction ratio at 850° C. or lower. For No. 10, the microstructure of the steel plate was not mainly composed of bainite, and the strength of base metal was inferior. This is probably because a large amount of ferrite was produced as a result of a low cooling start temperature in the first cooling. For Nos. 11 and 12, it is considered that the hardness of the surface layer part was increased as a result of an excessively high cooling rate in the first cooling, resulting in increased variation in Vickers hardness. Nos. 15 to 18 were inferior in at least one of the strength of base metal, Charpy properties, and HAZ toughness because their steel compositional ranges were outside the range of the present disclosure.

TABLE 1

| Steel ID | \multicolumn{11}{c}{Chemical composition (mass %)} | | | | | | | | | | |
|---|---|---|---|---|---|---|---|---|---|---|---|
| | C | Si | Mn | P | S | Mo | Ti | Nb | V | Al | Cu | Ni |
| A | 0.072 | 0.24 | 1.78 | 0.008 | 0.0008 | 0.28 | 0.011 | 0.024 | 0.023 | 0.032 | — | — |
| B | 0.065 | 0.16 | 1.82 | 0.008 | 0.0008 | 0.14 | 0.018 | 0.044 | 0.066 | 0.035 | 0.10 | 0.20 |
| C | 0.060 | 0.20 | 1.79 | 0.008 | 0.0008 | 0.20 | 0.017 | 0.036 | 0.045 | 0.038 | 0.21 | 0.23 |
| D | 0.061 | 0.19 | 1.85 | 0.008 | 0.0008 | 0.19 | 0.008 | 0.043 | 0.036 | 0.034 | — | — |
| E | 0.062 | 0.10 | 1.78 | 0.008 | 0.0008 | 0.14 | 0.011 | 0.044 | — | 0.035 | 0.31 | 0.14 |
| F | 0.065 | 0.10 | 1.87 | 0.008 | 0.0008 | 0.12 | 0.014 | 0.012 | — | 0.037 | 0.20 | 0.09 |
| G | 0.068 | 0.22 | 1.67 | 0.008 | 0.0008 | 0.15 | 0.020 | 0.036 | 0.052 | 0.041 | 0.15 | 0.21 |
| H | <u>0.024</u> | 0.35 | 1.85 | 0.008 | 0.0008 | 0.26 | 0.012 | 0.042 | 0.038 | 0.030 | 0.40 | 0.40 |
| I | 0.065 | 0.32 | 2.05 | 0.008 | 0.0008 | <u>0.02</u> | 0.015 | 0.035 | 0.063 | 0.032 | 0.15 | 0.20 |
| J | <u>0.106</u> | 0.25 | 1.86 | 0.008 | 0.0008 | 0.11 | 0.012 | 0.031 | — | 0.028 | — | — |
| K | 0.065 | 0.19 | 1.71 | 0.008 | 0.0008 | 0.19 | <u>0.043</u> | 0.038 | 0.047 | 0.041 | 0.30 | 0.22 |

| Steel ID | \multicolumn{6}{c}{Chemical composition (mass %)} | Ceq (mass %) | Ar$_3$ (° C.) | Remarks |
|---|---|---|---|---|---|---|---|---|---|
| | Cr | Ca | REM | B | O | N | | | |
| A | — | — | — | — | 0.002 | 0.004 | 0.43 | 723 | Conforming steel |
| B | 0.03 | — | 0.0012 | — | 0.002 | 0.005 | 0.44 | 720 | |
| C | — | — | — | 0.0005 | 0.002 | 0.005 | 0.44 | 715 | |
| D | 0.12 | — | — | — | 0.002 | 0.004 | 0.44 | 726 | |
| E | — | 0.0015 | — | — | 0.002 | 0.004 | 0.42 | 723 | |
| F | 0.02 | — | — | — | 0.002 | 0.005 | 0.42 | 721 | |
| G | 0.10 | 0.0023 | — | — | 0.002 | 0.004 | 0.43 | 727 | |
| H | — | — | — | — | 0.002 | 0.004 | 0.45 | 704 | Comparative steel |
| I | — | — | — | — | 0.002 | 0.005 | 0.45 | 686 | |
| J | — | — | — | — | 0.002 | 0.004 | 0.44 | 720 | |
| K | — | — | — | — | 0.002 | 0.005 | 0.43 | 720 | |

TABLE 2

| No. | Steel ID | Hot rolling | | Rolling finish temp. (° C.) | First cooling | | | |
|---|---|---|---|---|---|---|---|---|
| | | Heating temp. (° C.) | Cumulative rolling reduction ratio at or below 850° C. (%) | | Cooling start temp. $T_{s,1}$ (° C.) | Cooling rate $V_1$ (° C./s) | Cooling end temp. $T_{e,1}$ (° C.) | $(700 - T_{e,1})/V_1$ |
| 1 | A | 1250 | 75 | 800 | 750 | 100 | 300 | 4.0 |
| 2 | B | 1180 | 75 | 790 | 750 | 92 | 350 | 3.8 |
| 3 | C | 1180 | 70 | 810 | 755 | 98 | 400 | 3.1 |
| 4 | D | 1180 | 75 | 820 | 760 | 95 | 400 | 3.2 |
| 5 | E | 1150 | 80 | 800 | 780 | 94 | 410 | 3.1 |
| 6 | F | 1180 | 80 | 790 | 740 | 98 | 400 | 3.1 |
| 7 | G | 1190 | 75 | 770 | 740 | 85 | 430 | 3.2 |
| 8 | C | <u>1050</u> | 75 | 810 | 770 | 64 | 480 | 3.4 |
| 9 | C | 1150 | <u>65</u> | 800 | 750 | 40 | 420 | 7.0 |
| 10 | C | 1180 | 75 | 790 | <u>680</u> | 97 | 390 | 3.2 |
| 11 | C | 1100 | 75 | 780 | 730 | <u>130</u> | 300 | 3.1 |
| 12 | C | 1150 | 75 | 790 | 740 | <u>165</u> | 410 | <u>1.8</u> |
| 13 | C | 1180 | 75 | 820 | 760 | 97 | 390 | 3.2 |
| 14 | C | 1200 | 80 | 800 | 750 | 88 | 430 | 3.1 |
| 15 | H | 1150 | 75 | 800 | 740 | 92 | 400 | 3.3 |
| 16 | I | 1200 | 75 | 790 | 750 | 97 | 370 | 3.4 |
| 17 | J | 1180 | 75 | 800 | 740 | 99 | 380 | 3.2 |
| 18 | K | 1150 | 75 | 820 | 770 | 92 | 400 | 3.3 |

| No. | Second cooling | | Reheating | | | Plate thickness (mm) | Remarks |
|---|---|---|---|---|---|---|---|
| | Cooling rate $V_2$ (° C./s) | Cooling end temp. $T_{e,2}$ (° C.) | Reheating apparatus | Heating rate (° C./s) | Reheating temp. (° C.) | | |
| 1 | 20 | 490 | — | | | 51 | Example |
| 2 | 15 | 460 | — | | | 51 | |
| 3 | 14 | 380 | — | | | 38 | |
| 4 | 12 | 450 | — | | | 51 | |
| 5 | 15 | 330 | gas-fired furnace | 1 | 480 | 51 | |
| 6 | 14 | 210 | induction heating furnace | 3 | 430 | 51 | |
| 7 | 15 | 370 | — | | | 51 | |

TABLE 2-continued

| 8 | 15 | 340 | — | | | 51 | Comparative |
| 9 | 16 | 380 | — | | | 51 | Example |
| 10 | 12 | 460 | — | | | 51 | |
| 11 | 31 | 480 | — | | | 51 | |
| 12 | 25 | 420 | — | | | 51 | |
| 13 | 4 | 280 | — | | | 51 | |
| 14 | 12 | 530 | — | | | 51 | |
| 15 | 15 | 210 | induction heating furnace | 9 | 400 | 51 | |
| 16 | 12 | 250 | — | | | 51 | |
| 17 | 14 | 280 | — | | | 51 | |
| 18 | 14 | 220 | — | | | 51 | |

TABLE 3

| | | Microstructure | | Mechanical properties (before PWHT) | | Variation in Vickers hardness | | | | Mechanical properties (after PWHT) | | | |
| | | Area fraction of B* | Residual micro- | 0.5% YS | TS | Plate thickness direction | Plate widthwise direction | $vE_{-20\,°C.}$ | HAZ | 0.5% YS | TS | $vE_{-20\,°C.}$ | |
| No. | Steel ID | (%) | structure* | (MPa) | (MPa) | $\Delta HV_{10,t}$ | $\Delta HV_{10,c}$ | (J) | toughness | (MPa) | (MPa) | (J) | Remarks |
| 1 | A | 98 | M | 610 | 675 | 18 | 17 | 186 | Good | 604 | 671 | 174 | Example |
| 2 | B | 92 | M | 627 | 705 | 28 | 24 | 157 | Good | 612 | 670 | 133 | |
| 3 | C | 95 | M, MA | 643 | 725 | 16 | 17 | 195 | Good | 635 | 717 | 174 | |
| 4 | D | 95 | MA | 696 | 765 | 20 | 21 | 184 | Good | 677 | 745 | 152 | |
| 5 | E | 97 | MA | 665 | 750 | 17 | 18 | 178 | Good | 653 | 727 | 159 | |
| 6 | F | 96 | MA | 630 | 711 | 23 | 22 | 163 | Good | 616 | 695 | 139 | |
| 7 | G | 92 | MA | 657 | 741 | 17 | 19 | 165 | Good | 642 | 715 | 167 | |
| 8 | C | 93 | MA | 544 | 615 | 18 | 16 | 155 | Good | 540 | 600 | 156 | Comparative |
| 9 | C | 90 | MA | 600 | 685 | 17 | 19 | 66 | Good | 610 | 694 | 155 | Example |
| 10 | C | 75 | F, MA | 470 | 611 | 19 | 18 | 166 | Good | 514 | 610 | 142 | |
| 11 | C | 94 | M | 580 | 674 | 61 | 64 | 154 | Good | 575 | 656 | 145 | |
| 12 | C | 96 | M, MA | 604 | 695 | 73 | 69 | 136 | Good | 621 | 684 | 156 | |
| 13 | C | 91 | F, M | 601 | 628 | 18 | 20 | 87 | Good | 630 | 643 | 140 | |
| 14 | C | 90 | MA | 620 | 651 | 21 | 16 | 85 | Good | 622 | 678 | 135 | |
| 15 | H | 95 | M, MA | 545 | 610 | 17 | 17 | 150 | Good | 540 | 605 | 132 | |
| 16 | I | 95 | M, MA | 569 | 618 | 27 | 19 | 120 | Good | 573 | 600 | 141 | |
| 17 | J | 94 | M, MA | 640 | 760 | 16 | 17 | 88 | Good | 635 | 710 | 66 | |
| 18 | K | 92 | M, MA | 655 | 735 | 20 | 21 | 62 | Poor | 660 | 722 | 45 | |

*B: bainite, F: ferrite, M: martensite, MA: martensite austenite constituent

INDUSTRIAL APPLICABILITY

According to the present disclosure, it is possible to provide, as a high-strength steel plate of API X80 grade or higher with a thickness of 38 mm or more, a thick steel plate for structural pipes or tubes that exhibits high strength in the rolling direction, excellent Charpy properties at its mid-thickness part, and high material homogeneity without addition of large amounts of alloying elements, and a structural pipe or tube formed from the thick steel plate for structural pipes or tubes. The structural pipe or tube exhibits excellent material homogeneity and maintains excellent mechanical properties even after subjection to PWHT, and thus is extremely useful as a structural pipe or tube for a conductor casing steel pipe or tube, a riser steel pipe or tube, and so on.

The invention claimed is:

1. A steel plate for structural pipes or tubes, comprising:
a chemical composition that contains, in mass %,
 C: 0.030% to 0.100%,
 Si: 0.01% to 0.50%,
 Mn: 1.50% to 2.50%,
 Al: 0.080% or less,
 Mo: 0.05% to 0.50%,
 Ti: 0.005% to 0.025%,
 Nb: 0.005% to 0.080%,
 N: 0.001% to 0.010%,
 O: 0.005% or less,
 P: 0.010% or less,
 S: 0.0010% or less, and
 a balance consisting of Fe and inevitable impurities, with the chemical composition having a carbon equivalent $C_{eq}$ as defined by the following Expression (1) of 0.42 or more:

$$C_{eq}=C+Mn/6+(Cu+Ni)/15+(Cr+Mo+V)/5 \quad (1),$$

where each element symbol indicates content in mass % of the element in the steel plate and has a value of 0 if the element is not contained in the steel plate; and
 a microstructure that is mainly composed of bainite, an area fraction of the bainite being 90% or more,
wherein
 the steel plate has a plate thickness of 38 mm or more, and
 the steel plate satisfies a set of conditions including:
 a tensile strength being 705 MPa or more and 825 MPa or less;
 a Charpy absorption energy $vE_{-20°\,C.}$ at 20° C. at its mid-thickness part being 100 J or more;

a variation in Vickers hardness in a plate thickness direction $\Delta HV_{10,t}$ being 50 or less; and a variation in Vickers hardness in a plate widthwise direction $\Delta HV_{10,c}$ being 50 or less.

2. The steel plate for structural pipes or tubes according to claim 1, wherein the chemical composition further contains, in mass %, V: 0.005% to 0.100%.

3. The steel plate for structural pipes or tubes according to claim 2, wherein the chemical composition further contains, in mass %, one or more selected from the group consisting of Cu: 0.50% or less,
Ni: 0.50% or less,
Cr: 0.50% or less,
Ca: 0.0005% to 0.0035%,
REM: 0.0005% to 0.0100%, and
B: 0.0020% or less.

4. A method of producing a steel plate for structural pipes or tubes, comprising at least:

heating a steel raw material having the chemical composition as recited in claim 3 to a heating temperature of 1100° C. to 1300° C.;

hot-rolling the heated steel raw material, with a cumulative rolling reduction ratio at 850° C. or lower being set to 70% or more, to obtain a hot-rolled steel plate;

subjecting the hot-rolled steel plate to first cooling, whereby the hot-rolled steel plate is subjected to accelerated cooling under a set of conditions including, in terms of a surface temperature of the steel plate, a cooling start temperature $T_{s,1}$ being no lower than $Ar_3$, a cooling end temperature $T_{e,1}$ being 500° C. or lower, and an average cooling rate $V_1$ being 20° C./s or higher and 100° C./s or lower, so that the following Expression (2) is satisfied:

$$3 \le (700-T_{e,1})/V_1 \qquad (2),$$

where units are ° C. for $T_{e,1}$ and ° C./s for $V_1$;

subjecting the steel plate to second cooling after the first cooling, whereby the steel plate is subjected to accelerated cooling under a set of conditions including, in terms of an average temperature of the steel plate, a cooling end temperature $T_{e,2}$ being 500° C. or lower and an average cooling rate $V_2$ being 5° C./s or higher, and thereby producing the steel plate having a plate thickness of 38 mm or more, the steel plate having a microstructure that is mainly composed of bainite, an area ratio of the bainite being 90% or more, and the steel plate satisfying a set of conditions including:
a tensile strength being 705 MPa or more and 825 MPa or less;
a Charpy absorption energy $vE_{-20° C.}$ at −20° C. at its mid-thickness part being 100 J or more;
a variation in Vickers hardness in a plate thickness direction $\Delta HV_{10,t}$ being 50 or less; and
a variation in Vickers hardness in a plate widthwise direction $\Delta HV_{10,c}$ being 50 or less.

5. The method producing a steel plate for structural pipes or tubes according to claim 4, further comprising, immediately after the second cooling, reheating the steel plate to a temperature range of 400° C. to 700° C. at a heating rate from 0.5° C./s to 10° C./s.

6. A structural pipe or tube formed from the steel plate for structural pipes or tubes as recited in claim 3.

7. A structural pipe or tube obtainable by forming the steel plate as recited in claim 3 into a tubular shape in its longitudinal direction, and then joining butting faces by welding from inside and outside to form at least one layer on each side along the longitudinal direction.

8. A method of producing a steel plate for structural pipes or tubes, comprising at least:

heating a steel raw material having the chemical composition as recited in claim 2 to a heating temperature of 1100° C. to 1300° C.;

hot-rolling the heated steel raw material, with a cumulative rolling reduction ratio at 850° C. or lower being set to 70% or more, to obtain a hot-rolled steel plate;

subjecting the hot-rolled steel plate to first cooling, whereby the hot-rolled steel plate is subjected to accelerated cooling under a set of conditions including, in terms of a surface temperature of the steel plate, a cooling start temperature $T_{s,1}$ being no lower than $Ar_3$, a cooling end temperature $T_{e,1}$ being 500° C. or lower, and an average cooling rate $V_1$ being 20° C./s or higher and 100° C./s or lower, so that the following Expression (2) is satisfied:

$$3 \le (700-T_{e,1})/V_1 \qquad (2),$$

where units are ° C. for $T_{e,1}$ and ° C./s for $V_1$;

subjecting the steel plate to second cooling after the first cooling, whereby the steel plate is subjected to accelerated cooling under a set of conditions including, in terms of an average temperature of the steel plate, a cooling end temperature $T_{e,2}$ being 500° C. or lower and an average cooling rate $V_2$ being 5° C./s or higher, and thereby producing the steel plate having a plate thickness of 38 mm or more, the steel plate having a microstructure that is mainly composed of bainite, an area ratio of the bainite being 90% or more, and the steel plate satisfying a set of conditions including:
a tensile strength being 705 MPa or more and 825 MPa or less;
a Charpy absorption energy $vE_{-20° C.}$ at −20° C. at its mid-thickness part being 100 J or more;
a variation in Vickers hardness in a plate thickness direction $\Delta HV_{10,t}$ being 50 or less; and
a variation in Vickers hardness in a plate widthwise direction $\Delta HV_{10,c}$ being 50 or less.

9. The method producing a steel plate for structural pipes or tubes according to claim 8, further comprising, immediately after the second cooling, reheating the steel plate to a temperature range of 400° C. to 700° C. at a heating rate from 0.5° C./s to 10° C./s.

10. A structural pipe or tube formed from the steel plate for structural pipes or tubes as recited in claim 2.

11. A structural pipe or tube obtainable by forming the steel plate as recited in claim 2 into a tubular shape in its longitudinal direction, and then joining butting faces by welding from inside and outside to form at least one layer on each side along the longitudinal direction.

12. The steel plate for structural pipes or tubes according to claim 1, wherein the chemical composition further contains, in mass %, one or more selected from the group consisting of Cu: 0.50% or less,
Ni: 0.50% or less,
Cr: 0.50% or less,
Ca: 0.0005% to 0.0035%,
REM: 0.0005% to 0.0100%, and
B: 0.0020% or less.

13. A method of producing a steel plate for structural pipes or tubes, comprising at least:
heating a steel raw material having the chemical composition as recited in claim 12 to a heating temperature of 1100° C. to 1300° C.;
hot-rolling the heated steel raw material, with a cumulative rolling reduction ratio at 850° C. or lower being set to 70% or more, to obtain a hot-rolled steel plate;
subjecting the hot-rolled steel plate to first cooling, whereby the hot-rolled steel plate is subjected to accelerated cooling under a set of conditions including, in terms of a surface temperature of the steel plate, a cooling start temperature $T_{s,1}$ being no lower than $Ar_3$, a cooling end temperature $T_{e,1}$ being 500° C. or lower, and an average cooling rate $V_1$ being 20° C./s or higher and 100° C./s or lower, so that the following Expression (2) is satisfied:

$$3 \leq (700-T_{e,1})/V_1 \quad (2),$$

where units are ° C. for $T_{e,1}$ and ° C./s for $V_1$;
subjecting the steel plate to second cooling after the first cooling, whereby the steel plate is subjected to accelerated cooling under a set of conditions including, in terms of an average temperature of the steel plate, a cooling end temperature $T_{e,2}$ being 500° C. or lower and an average cooling rate $V_2$ being 5° C./s or higher, and
thereby producing the steel plate having a plate thickness of 38 mm or more,
the steel plate having a microstructure that is mainly composed of bainite, an area ratio of the bainite being 90% or more, and
the steel plate satisfying a set of conditions including:
a tensile strength being 705 MPa or more and 825 MPa or less;
a Charpy absorption energy $vE_{-20° C.}$ at −20° C. at its mid-thickness part being 100 J or more;
a variation in Vickers hardness in a plate thickness direction $\Delta HV_{10,t}$ being 50 or less; and
a variation in Vickers hardness in a plate widthwise direction $\Delta HV_{10,c}$ being 50 or less.

14. The method producing a steel plate for structural pipes or tubes according to claim 13, further comprising, immediately after the second cooling, reheating the steel plate to a temperature range of 400° C. to 700° C. at a heating rate from 0.5° C./s to 10° C./s.

15. A structural pipe or tube formed from the steel plate for structural pipes or tubes as recited in claim 12.

16. A structural pipe or tube obtainable by forming the steel plate as recited in claim 12 into a tubular shape in its longitudinal direction, and then joining butting faces by welding from inside and outside to form at least one layer on each side along the longitudinal direction.

17. A method of producing a steel plate for structural pipes or tubes, comprising at least:
heating a steel raw material having the chemical composition as recited in claim 1 to a heating temperature of 1100° C. to 1300° C.;
hot-rolling the heated steel raw material, with a cumulative rolling reduction ratio at 850° C. or lower being set to 70% or more, to obtain a hot-rolled steel plate;
subjecting the hot-rolled steel plate to first cooling, whereby the hot-rolled steel plate is subjected to accelerated cooling under a set of conditions including, in terms of a surface temperature of the steel plate, a cooling start temperature $T_{s,1}$ being no lower than $Ar_3$, a cooling end temperature $T_{e,1}$ being 500° C. or lower, and an average cooling rate $V_1$ being 20° C./s or higher and 100° C./s or lower, so that the following Expression (2) is satisfied:

$$3 \leq (700-T_{e,1})/V_1 \quad (2),$$

where units are ° C. for $T_{e,1}$ and ° C./s for $V_1$;
subjecting the steel plate to second cooling after the first cooling, whereby the steel plate is subjected to accelerated cooling under a set of conditions including, in terms of an average temperature of the steel plate, a cooling end temperature $T_{e,2}$ being 500° C. or lower and an average cooling rate $V_2$ being 5° C./s or higher, and
thereby producing the steel plate having a plate thickness of 38 mm or more,
the steel plate having a microstructure that is mainly composed of bainite, an area ratio of the bainite being 90% or more, and
the steel plate satisfying a set of conditions including:
a tensile strength being 705 MPa or more and 825 MPa or less;
a Charpy absorption energy $vE_{-20° C.}$ at −20° C. at its mid-thickness part being 100 J or more;
a variation in Vickers hardness in a plate thickness direction $\Delta HV_{10,t}$ being 50 or less; and
a variation in Vickers hardness in a plate widthwise direction $\Delta HV_{10,c}$ being 50 or less.

18. The method producing a steel plate for structural pipes or tubes according to claim 17, further comprising, immediately after the second cooling, reheating the steel plate to a temperature range of 400° C. to 700° C. at a heating rate from 0.5° C./s to 10° C./s.

19. A structural pipe or tube formed from the steel plate for structural pipes or tubes as recited in claim 1.

20. A structural pipe or tube obtainable by forming the steel plate as recited in claim 1 into a tubular shape in its longitudinal direction, and then joining butting faces by welding from inside and outside to form at least one layer on each side along the longitudinal direction.

* * * * *